United States Patent [19]

Mazumder et al.

[11] Patent Number: 5,446,549
[45] Date of Patent: Aug. 29, 1995

[54] METHOD AND APPARATUS FOR NONCONTACT SURFACE CONTOUR MEASUREMENT

[75] Inventors: Jyotirmoy Mazumder, Urbana, Ill.; David D. Voelkel, Redondo Beach, Calif.

[73] Assignee: The United States of America as represented by the Secretary of the Navy, Washington, D.C.

[21] Appl. No.: 4,763

[22] Filed: Jan. 14, 1993

[51] Int. Cl.$^6$ ............................................. G01B 11/24
[52] U.S. Cl. ............................ 356/376; 382/141
[58] Field of Search .................... 356/376; 348/87, 90, 348/126, 129, 130; 382/8

[56] References Cited

U.S. PATENT DOCUMENTS

| | | | |
|---|---|---|---|
| 4,912,336 | 3/1990 | Nayar et al. | 356/376 |
| 5,067,817 | 11/1991 | Glenn | 356/376 |
| 5,106,183 | 4/1992 | Voder | 356/376 |

FOREIGN PATENT DOCUMENTS

| | | | |
|---|---|---|---|
| 218407 | 9/1991 | Japan | 356/376 |
| 9112489 | 8/1991 | WIPO | 356/237 |

*Primary Examiner*—F. L. Evans
*Attorney, Agent, or Firm*—James T. Busch; William F. McCarthy; Thomas E. McDonald

[57] ABSTRACT

Light at known angles is impinged onto an object whose contour is to be measured and a camera is used to receive the reflected light which is then recorded. A computer processes the images, mathematically manipulating them so that surface slopes are known. The slopes are than integrated to obtain local elevations which represent the object contour.

13 Claims, 15 Drawing Sheets

Flowchart for Angle Versus Video Frame Correlation Program: Frameangle

Input: Coordinates of the translation arm at reference position, speed of translation arm, angle between fiber tip and metal lever strip with hinge at vertex, distance between axis of hinge and tip of fiber, coordinates of hinge, height of weld pool above tabletop, number of runs to be used in making the composite image, number of frames to be used for each run, estimate of the beginning and ending frames for weld pool reflection, and beginning and ending frames for polished flat surface reflection.

↓

Change the coordinates of the translation arm from optical table based coordinates to hinge based coordinates.

↓

Calculate the total number of frames estimated to contain reflections from the weld pool in them.

↓

From the geometry of the hinge, lever, and translation arm system, calculate the angle of the fiber tip from horizontal for each frame in the range of interest.

↓

FIG. 6a continued from Fig. 6a

Print the input parameters and the heading for the results.

Find the difference between the highest and lowest angles in the range of frames being considered for digitization.

Determine the ideal angular interval between digitized images to digitize images having nearly equally spaced fiber angles.

Set the videotape frame # to zero.

Increment the videotape frame #.

Start searching for the next frame to be digitized by calculating the ideal angle relative to the horizontal for the next frame to be digitized.

continued from Fig. 6c

FIG. 6b

```
┌─────────────────────────────────────────────┐
│ Flowchart for Image Analysis Program: Calcontour │
└─────────────────────────────────────────────┘
                      ↓
┌─────────────────────────────────────────────┐
│ Input: Pool width, camera angle, angle scaling factor, and │
│ whether symmetry is to be implemented.       │
└─────────────────────────────────────────────┘
                      ↓
┌─────────────────────────────────────────────┐
│ Read: 1) Scaled fiber angle composite image array. An ellipse │
│          has been added to the perimeter of the weld pool. │
│       2) Constant multiple composite image array. │
└─────────────────────────────────────────────┘
                      ↓
┌─────────────────────────────────────────────┐
│ Separate the ellipse from the                │
│ scaled angle composite image array.          │
└─────────────────────────────────────────────┘
                      ↓
┌─────────────────────────────────────────────┐
│ Convert both composite image arrays (scaled angle and │
│ constant multiple) from integers to actual values (degrees │
│ and multiples of 0.01).                      │
└─────────────────────────────────────────────┘
                      ↓
┌─────────────────────────────────────────────┐
│ Divide the composite angle array by the      │
│ composite constant multiple array to get     │
│ the average surface angle for each pixel.    │
└─────────────────────────────────────────────┘
                      ↓
```

FIG. 8a continued from Fig. 8a

Divide the composite angle array by the composite constant multiple array to get the average surface angle for each pixel.

Search for pixels with no associated angle and if found, interpolate to find the angle.

Calculate the fiber angle corresponding to reflection from each row for the polished workpiece.

For each pixel, calculate the surface angle of the weld pool surface by subtracting the polished workpiece fiber angle from the weld pool fiber angle and dividing by two.

Find the length of the minor axis of the ellipse and coordinates of the major axis.

Integrate the array of surface angles in order to obtain the surface contour.

FIG. 8b

METHOD AND APPARATUS FOR NONCONTACT SURFACE CONTOUR MEASUREMENT

BACKGROUND OF INVENTION

This invention relates to a measurement system for surface contours. Systems applying interferometry and holography exist to measure contours and deflections, respectively, on the order of wavelengths. Mechanical profiling systems exist which measure the contours of surfaces which are hard, can be touched, and are easily accessible. No system is known that can measure the surface shape of objects which have contours that vary more than wavelengths and are too soft, delicate, inaccessible, etc., to be touched by a probe.

The new system described here has variable sensitivity so it can measure deflections over the entire range that mechanical profiling systems can measure, but it does not have to touch the surface. This means surfaces such liquids, where touching the surface would invalidate the measurement, could be measured. Surfaces which are too soft for a mechanical probe could be measured because only light would be reflecting off the surface. Surfaces which are inaccessible to touch or where touching should be avoided such as electrically charged objects could still be measured. The new system allows noncontact measurements of objects which previously could not be measured, and it performs this function at a cost less than mechanical probe systems because the hardware for the new system is simpler and the inexpensive software is more sophisticated.

The following additional methods have all been tried and found wanting in some particular: shearography, projection moire, shadow moire, stereoscopic distance measurement, depth-of-focus distance measurement, reflecting of a finely focused beam, moire deflectometry, and grid projection with computer analysis.

This system is expected to be useful in quality control, prototyping, design, and as a research tool. The invention will not only allow some measurements to be made that could not previously be made, but it will be a cheaper alternative to expensive optical based profilers and delicate mechanical contact profiling systems. It will be cheaper because the expensive optics of optical based profilers and the delicate, expensive mechanisms involved in mechanical profilers would be replaced with an inexpensive light source, a simple CCD camera, and sophisticated software on a personal computer.

SUMMARY OF THE INVENTION

In this invention, light is impinged at known angles onto a surface and a camera is used to gather images of the surface which show the bright regions of glare where the light is specularly reflecting into the camera. The angle of the impinging light is varied in a controlled manner so that it is known for each camera frame. After collecting many of these frames, a computer is used to process the images, mathematically manipulating them to combine the information from each frame in order to produce a composite image of the surface with the slopes known over the entire surface. The slopes are then integrated to obtain the local elevations which together represent the contour of the surface. One application of our invention would be the measurement of the surface contour of a laser weld pool. The extremely high temperature and brightness of the molten pool under the high-powered laser beam make it necessary to use another laser as the light source.

In less demanding applications, an inexpensive light source could be substituted for the laser light source. Also, our system can be automated more and made easier to use by using a frame grabber capable of immediately storing the frames in the computer, thereby eliminating the need for images to be stored on videotape, using a line of light as a source instead of a single fiber, thereby reducing the number of light source passes to one, and using stepper motors to more reliably move the light source.

This measurement method is advantageous because it uses the rapidly increasing power of the computer to reduce the complexity of the optical hardware and relax the requirements on what type of object can be measured. In other words, the system gathers information in a simpler form (i.e., reflections) than other methods and makes up for this by using the power of a computer/image processor to calculate the surface shape. It can also be applied to surfaces which have properties and shapes which make it impossible to apply current measurement methods. This invention allows noncontact measurement of surface types which have previously been unsuitable for noncontact measurement methods and in many cases unsuitable for any type of measurement method. The surfaces which are unsuitable for noncontact methods are surfaces which are specular and have large surface slope variations. The surfaces which have been unsuitable for measurement by any method are those which are specular, have large surface slope variations, and cannot be touched with a probe. The laser weld pool is one example of the latter type of surface. Many of the classical methods have been tried, but none have worked. The new method described takes advantage of the specularity and large slope variations which are detrimental to the classical methods. It can even be applied to surface measurements as difficult as welding, burning fuels and propellants, soldering, and brazing where high temperatures are present and noncontact surface measurements are desired.

BRIEF DESCRIPTION OF DRAWINGS

FIGS. 5A through 3C comprise a flow chart which helps determine when to use the inventive method.

FIGS. 6A through 3D comprise a flow chart describing calculations done in program "frameangle."

FIGS. 8A through 3C comprise a flow chart describing calculations done in the program "calcontour."

DESCRIPTION OF THE PREFERRED EMBODIMENT

One of the fundamental steps of this method is to reflect light off a specular surface and measure the slope of the surface where the reflection is observed. This slope is measured indirectly by measuring the difference between the angles of the incident light when it reflects into a camera for a location on a flat surface and for the corresponding location on the weld pool. The basic equation to calculate this slope is:

$$\alpha_p = \frac{(\alpha_{fp} - \alpha_{ff})}{2} \qquad \text{Eq. 1.}$$

Figure 1:
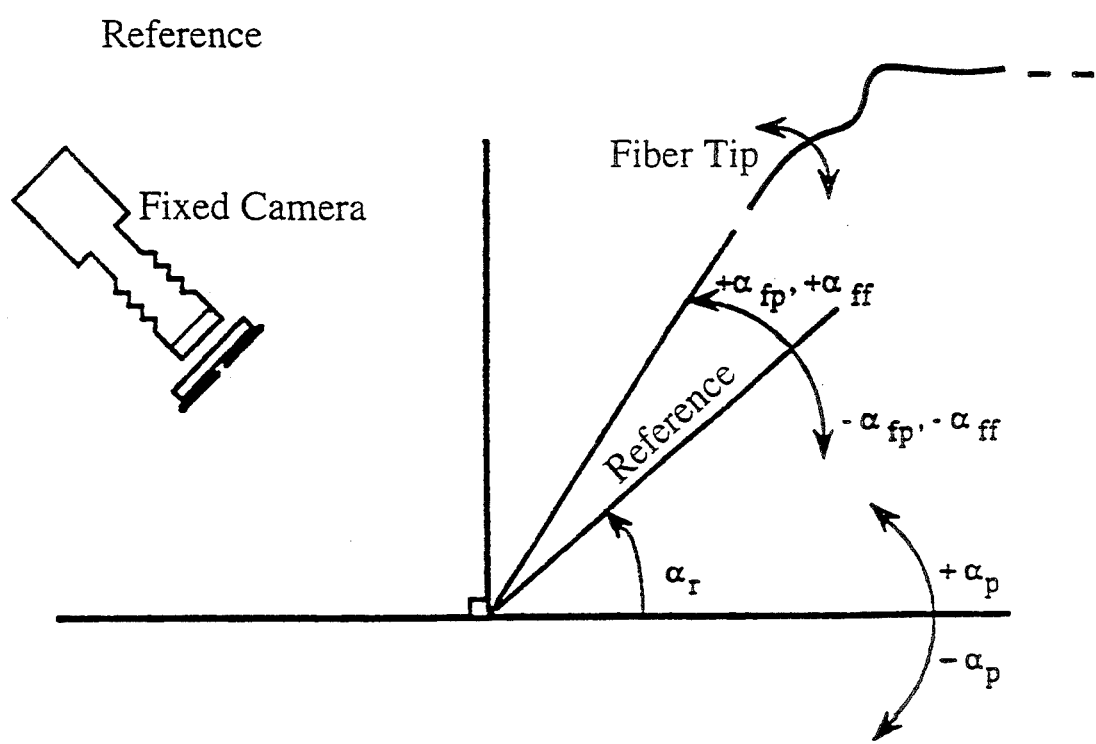
FIG. 1 is a schematic which shows the defining angles of interest to an understanding of the invention.
Figure 2:
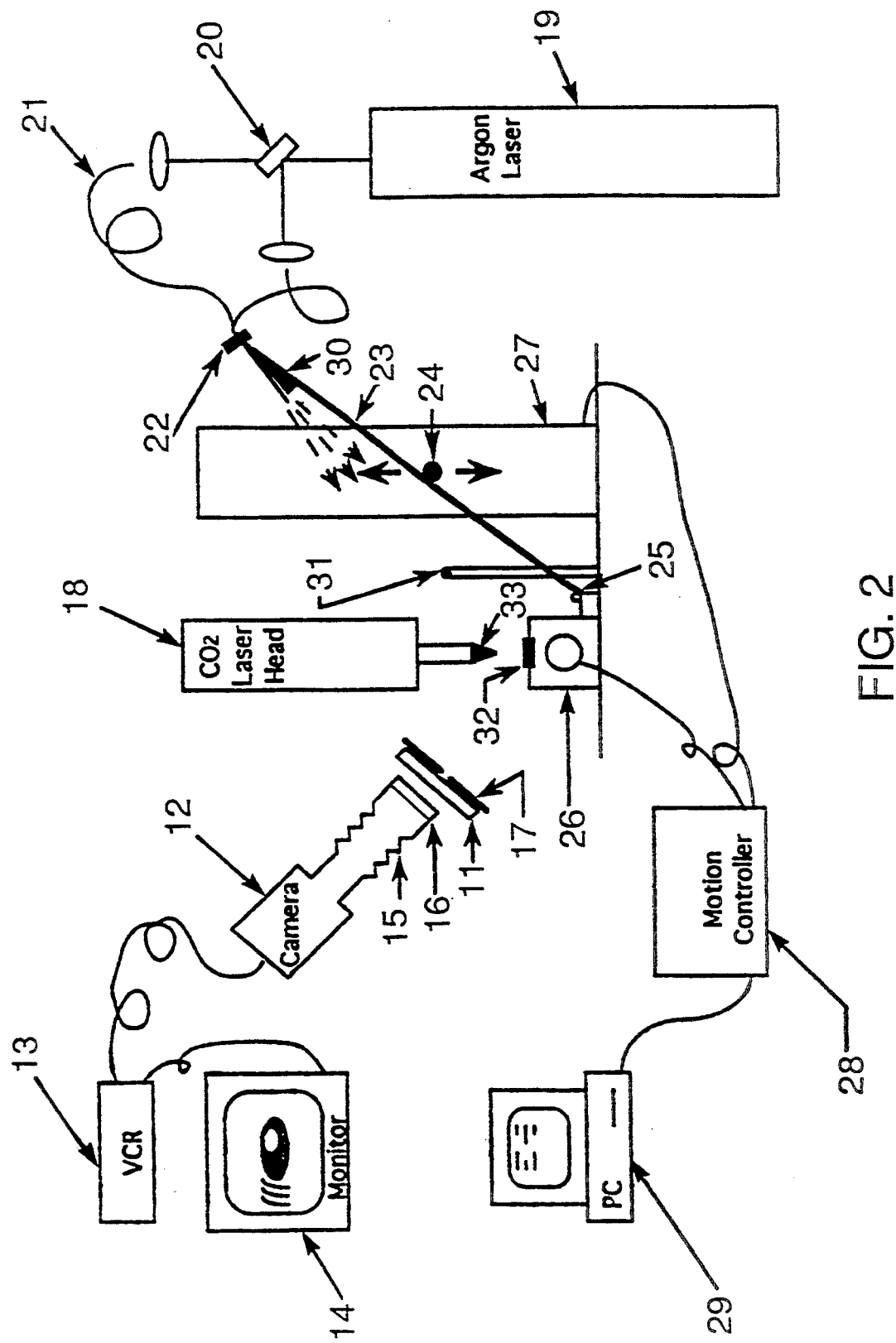
FIG. 2 is a schematic of the specular surface contour measurement system of the invention.

A schematic which helps to define the angles in the equation is shown in FIG. 1 where $\alpha_r$=reference angle=the angle of a fiber tip when the reflection of the argon laser light is in the center of the field of view on the polished flat surface and the shadow of the reference rod is in the middle of this reflection; $\alpha_{fp}$=the angle of the fiber tip (relative to reference); $\alpha_{ff}$=the angle of the fiber tip (relative to reference) when the center of the reflection on the polished flat workpiece is at the same row as the reflection on the weld pool; and $\alpha_p$=the angle of the pool surface at the location where the reflection is seen. "+" means the pool surface is sloping down toward the camera. Changing the angle of the incident light causes the location of the reflection to move. This is mainly due to the variation of surface slope, although the location where the reflection is seen on the surface also has some effect. The angle of the incident light is varied over a wide enough range for the reflection seen by the camera to travel over the surface. In this way, the slope of each portion of the surface is determined. When the slope variation of the surface is known, it can be integrated to get the surface elevation at each location and therefore the surface contour. An argon laser 19 and a narrow bandpass filter 11 both shown in FIG. 2 are used so a reflection can be seen on the weld pool. Argon laser light is used because of its high intensity and monochromaticity. The pool is viewed through a narrow bandpass filter 11 to reject light from the pool at other wavelengths and allow only the argon laser wavelength to be seen.

Accurate implementation of the measurement procedure is considerably more complicated than the basic theory behind the measurement. In order to describe the method and how to use it as clearly as possible, the very general description given in the previous paragraph can now be amplified with the following more detailed description.

A schematic of the specular surface contour measurement system is shown in FIG. 2. The CCD camera 12, VCR 13, monitor 14, tube 15, and lenses 16 are standard industrial items. The plate 17 is made of sheet metal and has a small hole of about 2 mm diameter. A Pulnix TM-745 CCD camera 12 was used at 1/60 and 1/125 second shutter speed. It produces thirty frames per second. The $CO_2$ laser 18 produces a beam that is focused close to the surface of a workpiece mounted on a translation stage. An argon laser 19 emits a beam at 514.5 nm and 0.5 to 2 W power. This beam may be split into equal parts by a beam splitter 20 and each half can be focused into an optical fiber 21. Alternatively, only one fiber may be used, but more runs may then be necessary. The optical fibers are approximately 1.2 mm diameter. Both fibers pass through a mode scrambler 22 which makes their emitted light more uniform, and both fibers are mounted side by side on a wedge shaped platform at the end of a rigid, flat, metal strip 23. The metal strip lies on top of a horizontal translation arm 24 and is attached to a hinge 25 near the optical table top and translation stage 26. The translation arm is attached to a translation stage 27 which is used to raise and lower the arm, thus raising and lowering the metal strip and changing the angle of the optical fiber tips in relation to the weld pool. Both of the translation stages 26 and 27 are run simultaneously by a MC-8 Centroid motion controller 28 and a computer 29 which in the present configuration is an IBM PS/2.

The wedge-shaped platform 30 between the metal strip and optical fibers is at an appropriate angle to illuminate the weld pool with the argon laser light throughout the entire angular range of the fiber tips. A horizontal reference rod 31 mounted between the weld pool 32 and optical fiber tips causes a shadow in the argon laser light to be cast on the weld pool when the pool, rod, and fiber tips are in line with each other. This shadow causes a dark frame to appear on the videotape that serves as a reference to determine the angle of the optical fiber tips for the other frames of the videotape. The diameter of this reference rod in the present work has been approximately 1 mm. The diameter of the rod would have to be larger in order to cause the dark frame if a larger weld pool is being measured, if the rod is closer to the pool, if the distance between the rod and the fiber tip is greater, or if the diameter of the fiber optic tip is greater. The exact placement of the reference rod will be described later.

Figure 3A:
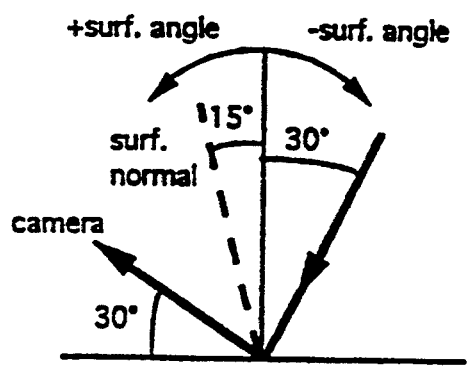
FIGS. 3A through 3D illustrate the range of surface angles that can be measured with the incident light and camera at their limits.
Figure 3B:
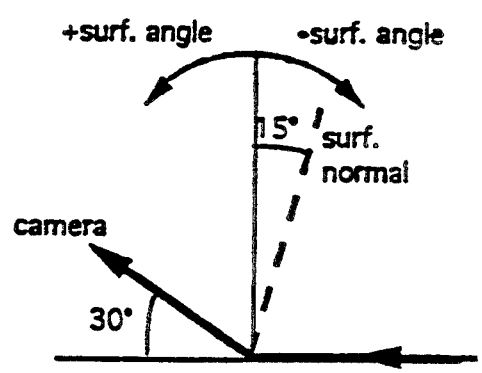
Figure 3C:
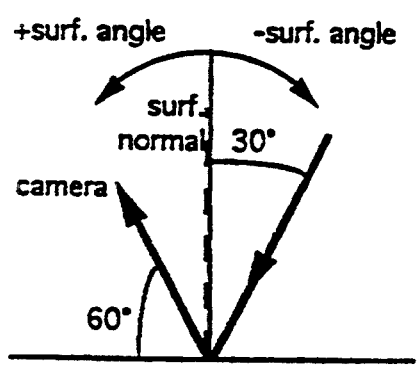
Figure 3D:
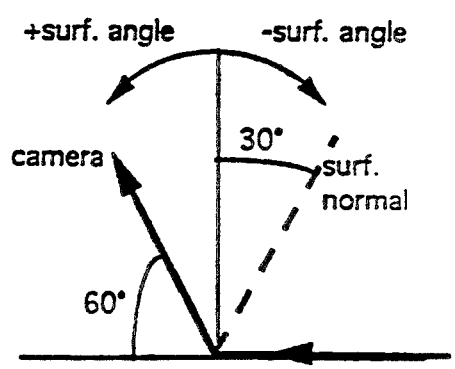

Dimensions of the system such as the height of the workpiece above the table and the distance between the hinge and fiber tip do not have to be at predetermined values. It is very important, however, to accurately measure these and other distances that are needed as input by a computer program named "frameangle" which will be described later. It is also important that the translation arm 24 move the optical fiber tips through as large an angle as possible so the argon laser light is incident on the weld pool at a wide range of angles. The constraints of this angle are the horizon of the workpiece and the shadow cast on the weld pool by the cover gas nozzle 33. The shadow of the nozzle is cast on the weld pool when the fiber tip is about 30 degrees from vertical. The camera can be positioned between about 30 and 60 degrees from horizontal. Below 30 degrees, any gain in the ability to measure a pool surface with a more positive slope is offset by a loss in ability to measure a negative slope. The diagrams in FIG. 3(a) and 3(b) help to illustrate this. Also, the pool cannot be viewed well if the viewing angle becomes close to the horizontal. The camera could not be positioned above 60 degrees because of the cover gas nozzle and the bulkiness of the laser head, camera lenses, and narrow bandpass filter. FIG. 3(a) and 3(b) show how surface slopes between +15 and −15 degrees can be measured when the camera is at 30 degrees. FIG. 3(c) and 3(d) show how surface slopes between 0 and −30 degrees can be measured when the camera is at 60 degrees. A 60 degree camera angle allows a wider range of surface slopes to be measured if symmetry can be used.

The basic measurement procedure proceeds as follows:

1. The actual workpiece is replaced with a flat polished workpiece so the reference rod and optical fibers can be aligned properly. The geometry of the system is then measured.
2. The optical fibers are moved as they would be during an actual experimental run but no $CO_2$ laser beam is used.

3. The polished workpiece is replaced with the actual workpiece and the experimental runs are performed.
4. A computer program is used to calculate a scaled fiber angle relative to the flat surface reference angle for each frame of the videotape.
5. Sixty to 90 of the videotape frames are digitized into the image processor and preliminary processing is performed.
6. Transfer the two composite images (scaled relative fiber angle image and the 0.01 image) to a Sun workstation.
7. Use a program on the Sun to:
   Change scaled fiber angles to actual fiber angles.
   Divide actual composite fiber angle image by the 0.01 composite image to get the average fiber angle for each location.
   Interpolate for missing data.
   For each location on the weld pool, calculate the weld pool surface angle from the weld pool fiber angle and polished surface fiber angle.
   Integrate the surface angles to get the surface contour.
   Apply symmetry about the major axis of the weld pool if desired.
   Rescale the weld pool so it appears as it would if viewed from above.
   Rescale the heights between 0 and 1 for display on the image processing monitor.

Before making actual bead-on-plate welds to get experimental data, the system must be aligned using a flat, polished workpiece the same thickness as the actual workpieces. The fiber tips, reference rod, and camera are aligned so both the reflection of the laser light on the polished workpiece and the shadow of the reference rod are centered in the camera's field of view. The angle of the fiber optic tips when the system is aligned in this way is called the reference angle. Its actual value will be calculated later from geometric measurements made at this stage. The reference angle is important because it is the angle that corresponds to zero slope in the center of the field of view for the surface to be measured. It is also important because at this angle the reference rod casts a shadow on the workpiece surface that causes a dark frame to appear in the videotape sequence while the fiber tip is being lowered and the weld pool is being recorded. This dark frame serves as a reference to determine the angle of the fiber at all of the other frames since it is only at this dark frame that the angle of the fiber tip is initially known.

Figure 4A:
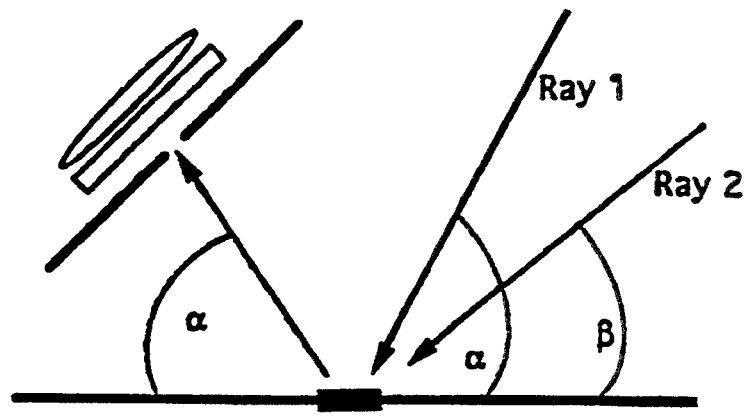
FIGS. 4A and 4B are schematics which shows how the angle of incident light being reflected into the camera depends on the location of the observed reflections.
Figure 4B:
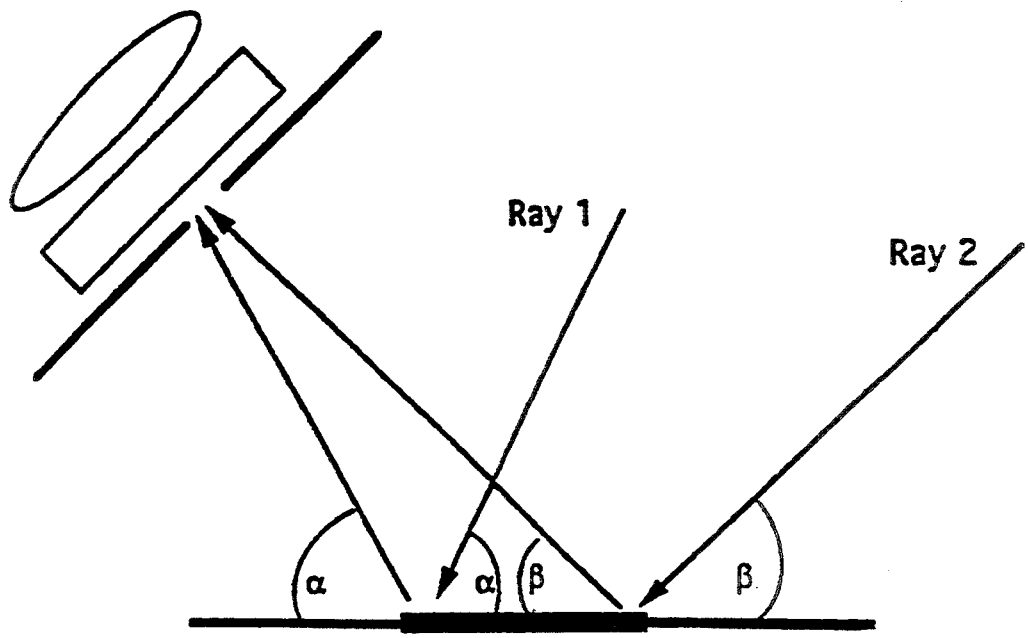

A dry run is then performed by moving the fiber optic tips through a range which causes their reflections on the polished flat workpiece to pass completely through the field of view. The optical fiber is moved using the translation arm and the speed of the arm should be the same as will be used during the actual experiments. No $CO_2$ laser beam is used at this time and the polished workpiece is kept motionless. This "dry run" is done to take into account the reflection does not always occur at the same spot and the angle of incident light being reflected into the camera is related to the location of the observed reflection on the polished flat workpiece. This effect is demonstrated by FIGS. 4a and 4b. In FIG. 4(a), one might expect ray 1 to enter the camera and ray 2 not to enter, but in reality as shown in FIG. 4(b), the angles of the rays that enter the camera vary based on the location they strike the surface.

The polished workpiece is then replaced with an actual workpiece and the real bead-on-plate welds are made. The fiber tips are moved through their vertical range for each weld. The objective is to obtain a reflection from every part of the weld pool surface, so usually 3 to 8 separate weld passes need to be made. For each weld pass, the fiber tips and hinge are moved to the side a small distance so the reflection occurs along a different vertical strip on the weld pool. Since data for the entire pool surface contour is not acquired at the same moment, the weld pool surface is assumed to be at steady-state. When the weld pool is viewed with argon laser light incident on it at a constant angle, the area of reflection on the pool surface moved very little. Therefore, the assumption of steady-state is believed to be nearly true for the weld pools measured.

After the weld reflections have been recorded on videotape, a computer program called "frameangle" is run to determine which of the videotape frames are to be entered into the image processor for calculation of the surface contour and what scaled fiber angle is associated with each frame. This computer program also calculates the actual fiber angles for selected frames. These actual angles are used in a process whereby an equation is developed to take into account the effect described in FIGS. 4a and 4b.

The videotape frames indicated by the computer program are now digitized into a Vicom image processor along with their corresponding scaled fiber angles calculated by the computer program. A procedure file in the image processor is called to digitize each frame, do preliminary processing on it, duplicate it, multiply one copy by its corresponding scaled angle and the other copy by a constant, and add them to the previous frames. In this way, two composite images are obtained. One composite image contains summed scaled angles and the other composite image shows how many scaled angles were summed at each pixel location.

These two composite images are transferred to the Sun workstation and a program called "calcontour" does many calculations necessary to obtain the elevation of the surface at each pixel location. Although many calculations are performed, there are two which need to be emphasized here so the basic idea of the measurement method can be understood. First, the composite image which contains the summed fiber angles at each pixel is divided by the image that represents the number of angles summed at each pixel. This division results in an average fiber angle for each pixel.

$$\overline{a}_{i,j} = \frac{a_{i,j}}{n_{i,j}} \bigg|_{i=1 \text{ to } 512} \bigg|_{j=1 \text{ to } 512} \text{ for } n_{i,j} \neq 0 \qquad \text{Eq. 2.}$$

Where $a_{ij}$=average fiber angle for pixel i,j; $a_{ij}$ sum of fiber angles at pixel i,j; $n_{ij}$=number of fiber angles summed at pixel i,j; i=row of image; and j=column of image. Weld pool surface angles are calculated by using these average fiber angles determined in Eq. 2. The second important step is the integration of these weld pool surface angles to get the weld pool surface elevation at each pixel. Simpson's ⅓ rule is used as shown in Eq. 3.

$$h_{i,j} = h_{i-1,j} = a_{p(i,j)} \frac{md\pi}{(3)(180)} \text{ for } i = 2 \text{ to } 512, \text{ and } j = 1 \text{ to } 512 \qquad \text{Eq. 3.}$$

Where h=height; m=2 if i is odd and 4 if i is even; d=distance per pixel width; and $\alpha_p$=angle of the pool in degrees. After the calculations are done, the array is rescaled between 0 and 1 and transferred back to the image processor for display of the surface contour.

The method of our invention was developed in particular for the purpose of measuring the surface contour of the shallow laser weld pool. Since surface contours have a wide range of slopes, care must be taken to be sure the range of motion of the fiber tip is large enough to obtain reflections from enough of the surface to make an accurate measurement. An example of a situation that must be avoided is where the fiber does not move far enough for the reflection to completely pass over the top or bottom of the pool perimeter. It is not good enough just to obtain a reflection from the area. If the reflection does not completely pass over the region, the slope at that region can be inaccurate. This is because the reflection when the fiber angle is incremented would still partially cover the same region as the previous frame. The reflection area the two fiber angles have in common should be represented by the average of the two angles but since the second fiber angle was never reached, it is only represented by the first angle. Another example of when insufficient care could cause erroneous results to be obtained is when the fiber tips disappear below the horizon of the workpiece. There may actually be a portion of the pool that would reflect the light into the camera but the light is not incident on the pool because it is being blocked by the workpiece itself.

Figure 5A:
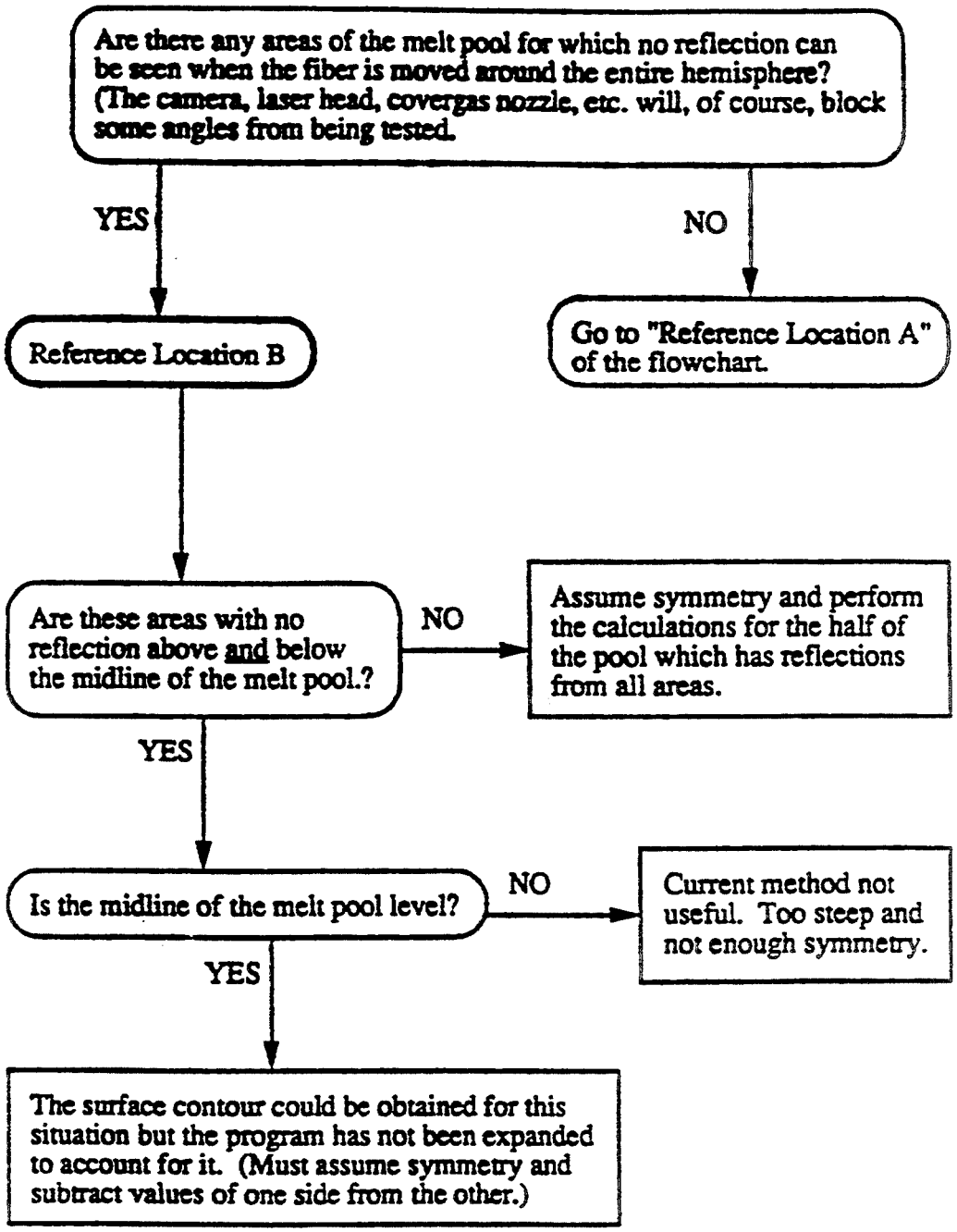
Figure 5B:
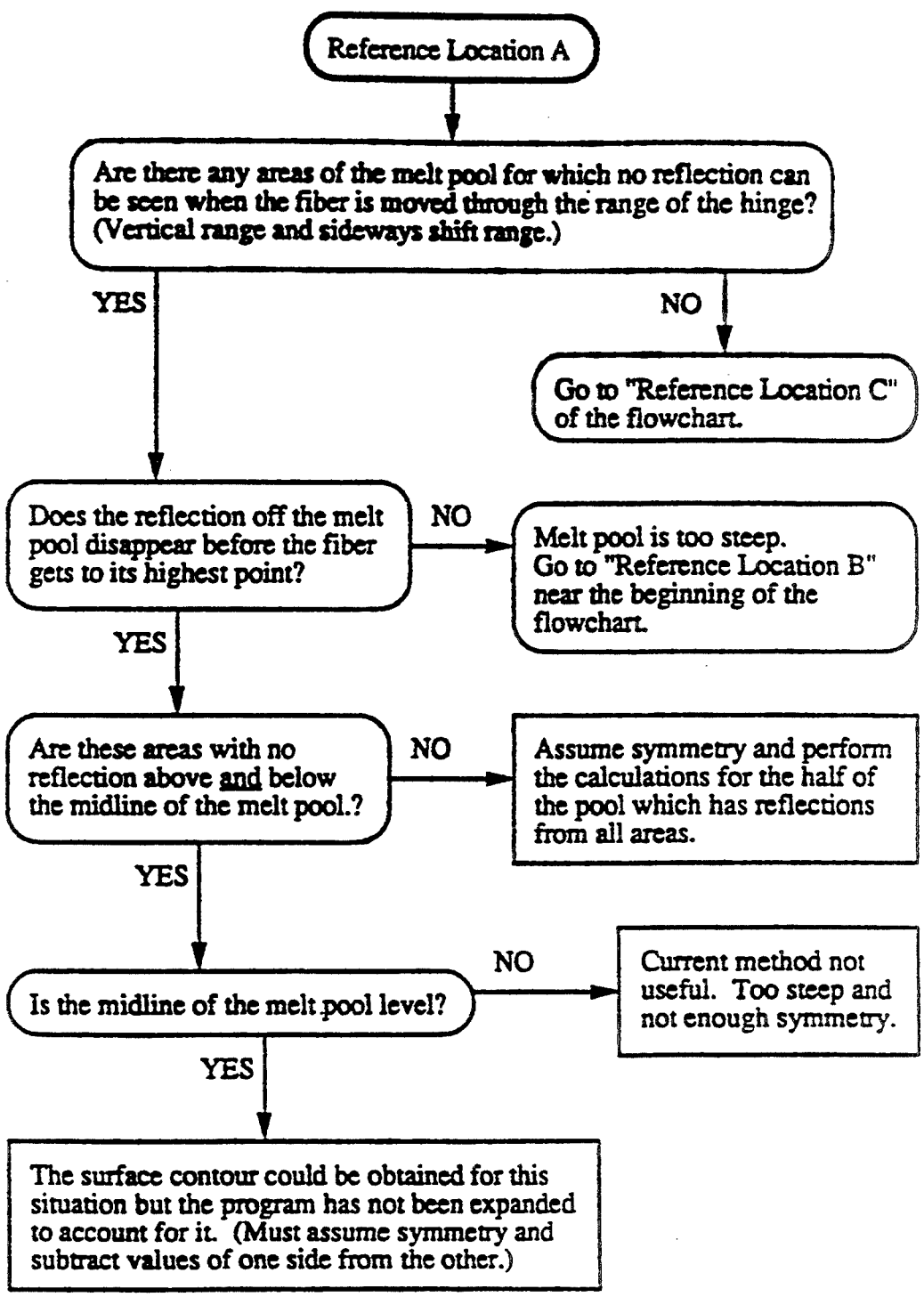
Figure 5C:
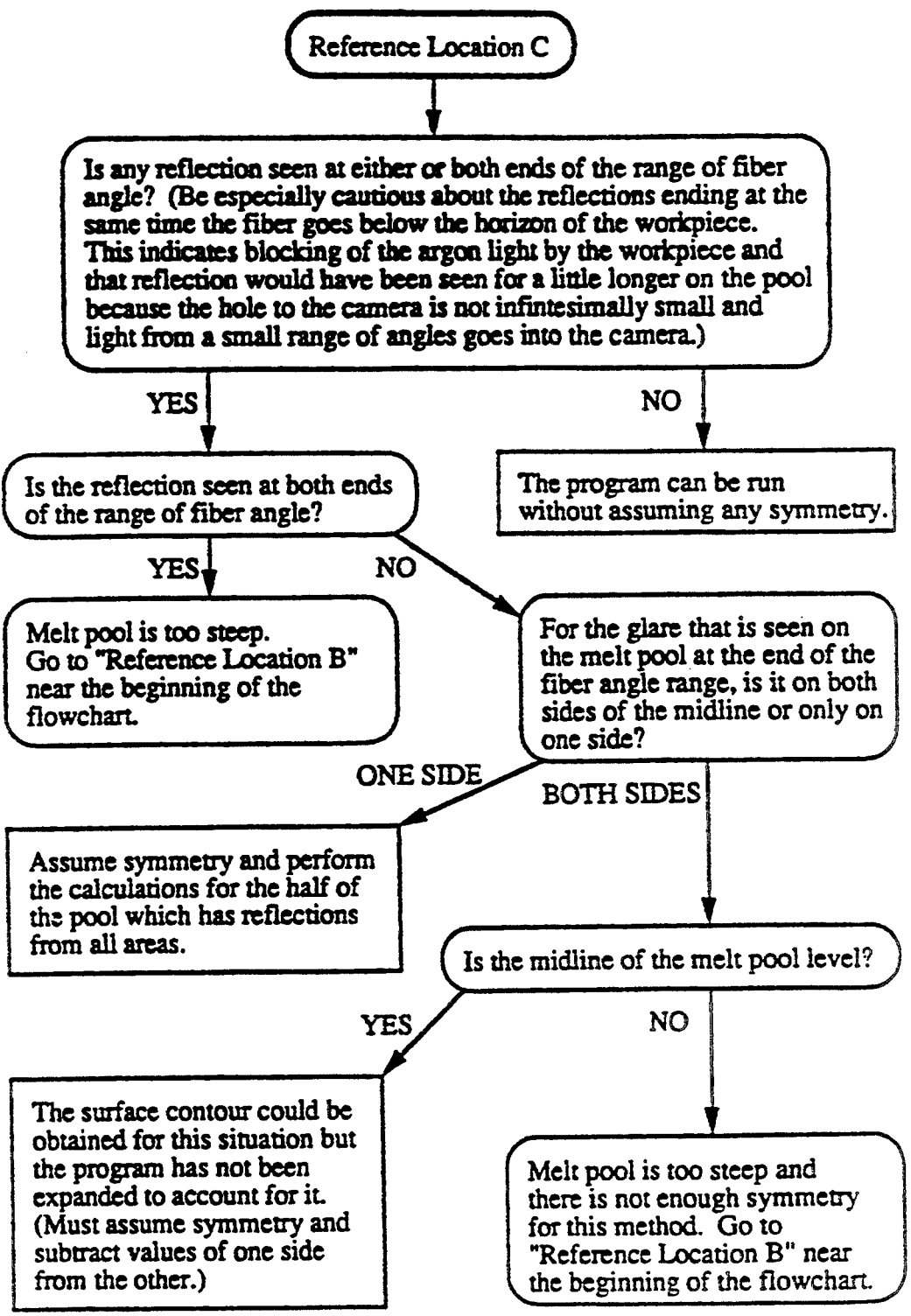
Figure 6C:
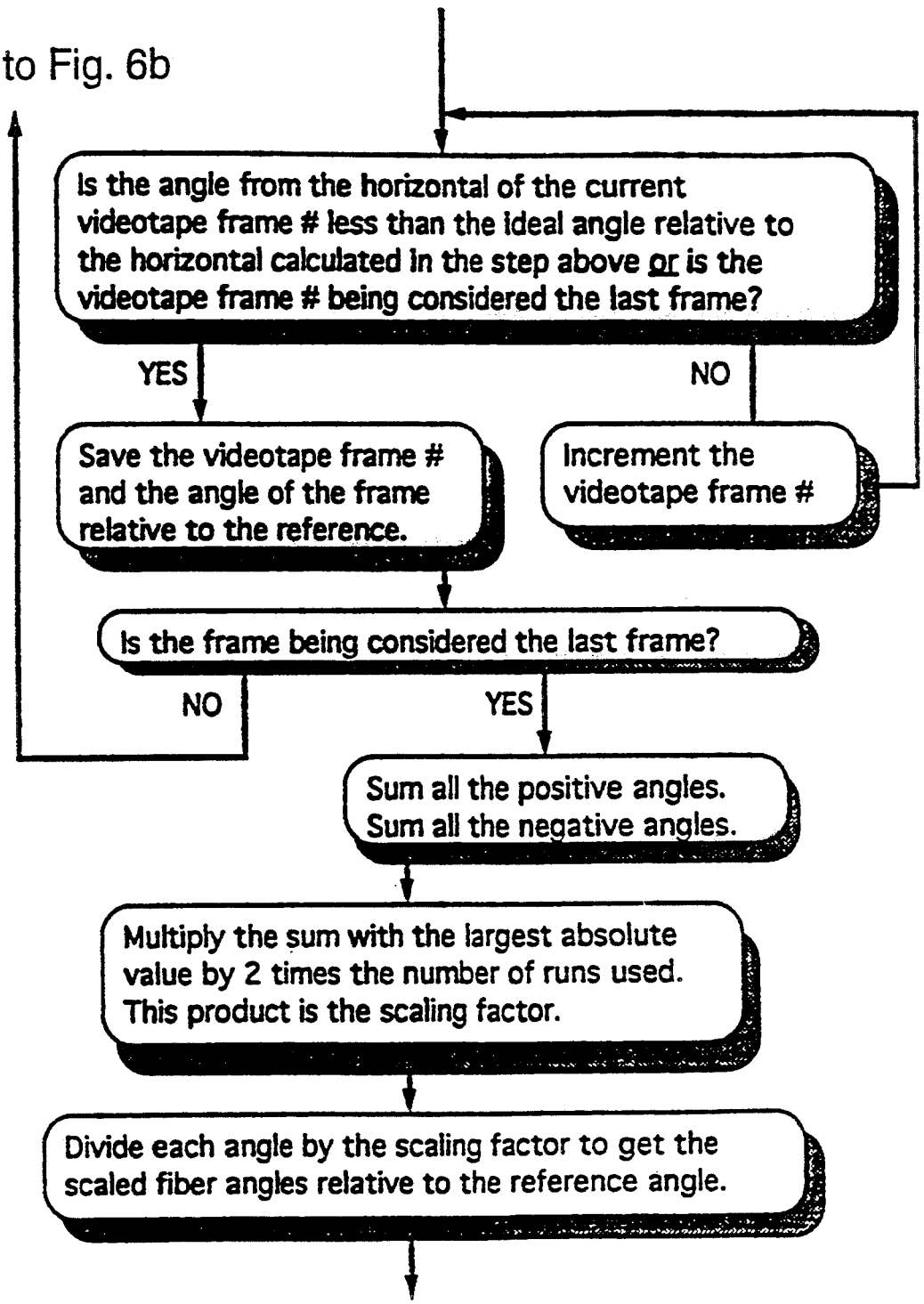
Figure 6D:
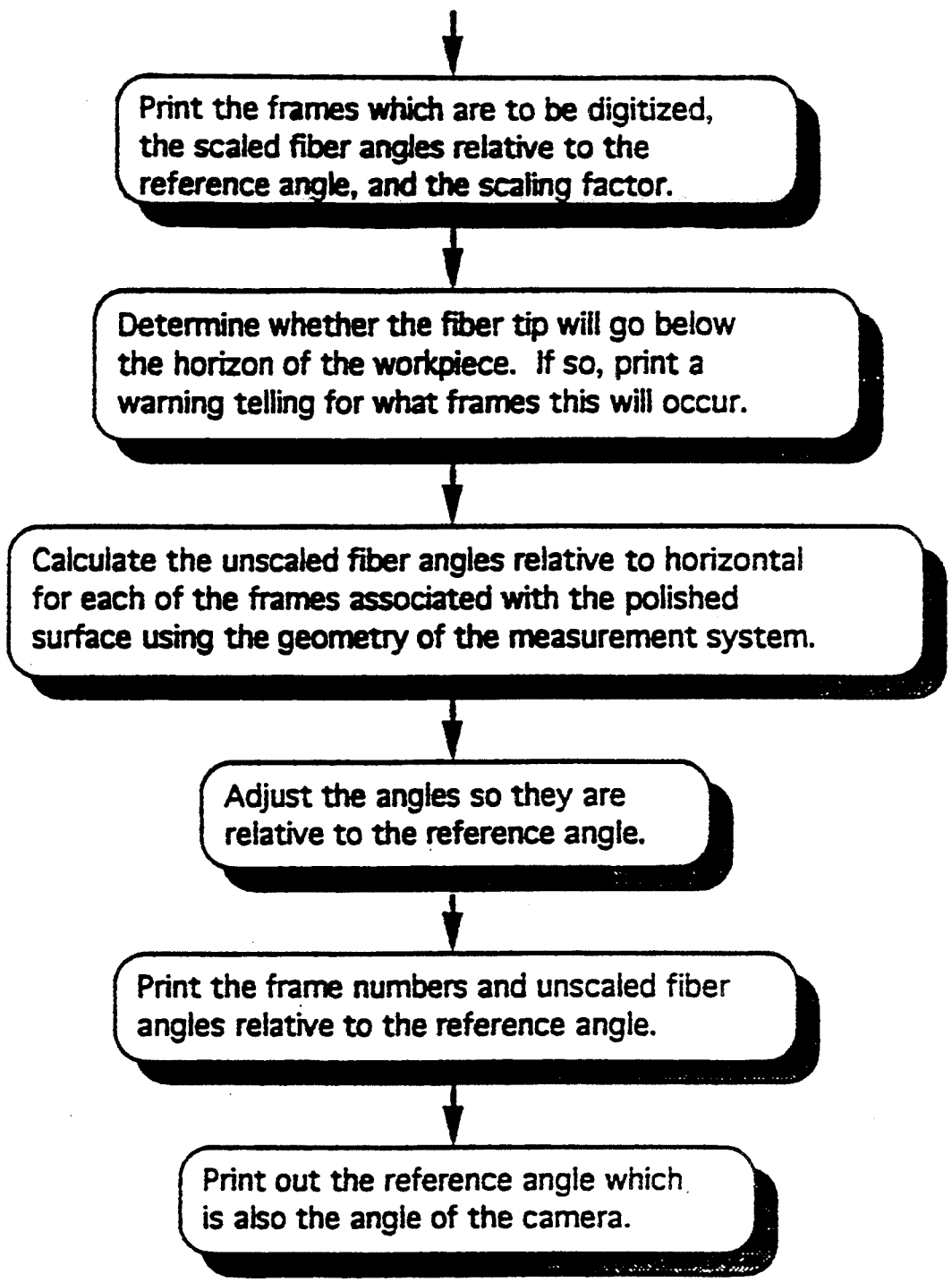

Although the method has been developed for the shallow laser weld pool, it could be applied to other specular situations. If the situation is different than the present one, modifications will probably have to be made in the experimental setup and the programs used for analysis. To anticipate the method's use in other applications and direct its accurate use in the measurement of the shallow weld pool, a flow chart has been developed and is shown in FIGS. 5a to 5c. Determination of how the weld pool or surface to be measured fits into this flow chart is the first step to accurate measurement of the surface contour.

After checking to be sure the translation arm moves up and down enough to obtain reflections from the weld pool as directed by the flowchart in FIG. 5b, the following steps should be followed to obtain the data needed for further analysis:

1. Position the laser head and camera to center the melt pool in the field of view. The camera angle should be between about 30 and 60 degrees. Thirty degrees is useful for slopes between about 15 and −15 degrees. Sixty degrees is useful for slopes between about 0 and −30 degrees when symmetry is assumed.
2. Focus the camera.
3. For the conditions of interest, make a run and move the fiber tip by hand around the hemisphere above the pool. Observe the relationship between the position of the fiber and the location of reflection on the pool in order to indicate whether the slopes are level enough for the hinge method to provide the data needed. The flow chart in FIGS. 5a through 5c will help in this decision making process.

Additionally: If several runs are to be made, time and energy may be conserved by performing step 3 for each set of conditions before reattaching the fiber and continuing with the rest of the steps.

4. Reattach the fiber to the mount.
5. Position the elevating arm so that the fiber is moved through a large enough range to obtain reflection from the back of the pool to the front of the pool (or vice versa). Be cautious at the ends of the fiber range that lack of reflection is not due to blockage of the argon laser light by the cover gas nozzle 33 or workpiece horizon. If symmetry will be applied when calculating the surface contour, the reflection as the fiber moves may be only above the midline although it is helpful in placing the ellipse around the pool if its whole perimeter can be seen.
6. Straighten the translation arm so that it is level and parallel to the line of the weld.
7. Replace the actual workpiece with a polished flat workpiece. Position the elevating arm so that the area of reflection on the polished workpiece is in the center of view of the camera. The hinge may have to be shifted a little to one side or the other.
8. Position the slender reference rod so that the shadow of the reference rod blocks out the light in the center of the camera's field of view. The slender reference rod should be level and parallel to the line of the weld.
9. Measure all the geometric parameters necessary to run the program "frameangle".
10. A polished workpiece reference recording must be obtained to account for the variation in the location of the reflection on the polished workpiece as the angle of the fiber changes. For this recording, the translation arm is moved just as it would be when performing a real bead-on-plate weld experiment.
11. Determine what parameters need to be input into "MOTOR2.BAS" in order to move the fiber through the desired range.
12. Perform the run with the translation stage beginning in the high position and coming down at a speed of approximately 20 mm/s using the BASIC program "MOTOR2.BAS".
13. Check the recorded run to be certain the relationship between the reflection and the extremes of the fiber angle range are as anticipated. Also check to be certain the shadow of the reference rod is visible and the reflected argon light is bright enough for input into the Vicom.
14. Make more runs, moving the fiber tip left or right for each run. The hinge for the fiber lever arm should be moved parallel to the elevating arm and reference rod. The purpose of this is to obtain reflections all the way across the pool, from both sides of the pool, as viewed from the camera. Three to 8 runs are usually needed. Since the amount the fiber has to be shifted left and right is unknown, more than this may need to be performed in order to obtain the ones that will be used. If it is necessary to move the fiber translation stage or elevating arm, they should be moved along their original line. For the measurements made so far, the $CO_2$ laser beam and the helium cover gas were passed through a 2.02 cm inner diameter pipe. A washer was inserted in the bottom of the pipe so the hole at the exit has a diameter of 1.2 cm. The correct length of pipe was matched to the height of the laser head so the distance between the bottom of the pipe and the workpiece was always 2 cm. The helium flowrate was measured using a Filmont gage and program. The speed of the workpiece was 2 mm/s. The 5130 steel workpiece was cleaned. A BASIC program named "MOTOR2.BAS" on an IBM PS/2 30/286 sent instructions to a Centroid MC-8 motion controller. This moved the workpiece translation stage and fiber optic translation arm simultaneously but at different speeds, distances, and directions as desired. When both fiber optics are used, the fiber tips must be kept in a line parallel to the bead-on-plate weld. The fiber tips have always been started high and lowered in order to make the measurements but the measurements could also be made by raising the fiber tips. The speed used for the fiber optic translation arm has been 19.8 mm/s. A translation arm speed of approximately 20 mm/s is a good speed to use for the current system design. The faster the speed, the shorter the length of time the reflection will be on the pool, and the fewer frames of videotape with the reflection will be recorded. This is no problem when the fiber optic tips are high. The design of the lever and translation arm causes the fiber optic tips to move slowly when they are high. But when the lever is nearly horizontal, the tips move quickly. If the translation arm moved much faster than about 20 mm/s, there might not be enough frames recorded to get the necessary data when the lever is nearly horizontal. For a much slower translation arm speed, it would be necessary to sort through a greater number of frames at the beginning of the run because the fiber optic tip would be moving very much slower there. A longer workpiece would also be needed since it would take longer to record the data.

At this point, the measurements of the system geometry have been recorded, the dry run with the polished workpiece has been videotaped, and enough actual bead-on-plate welds have been videotaped as the fiber optic tip(s) has been lowered to map out the entire surface. The next step is to run a computer program called "frameangle." The flow chart for "frameangle" is shown in FIGS. 6a through 6d. "Frameangle" calculates values which will be needed for further analysis of the videotape data. One of the things the program does is to determine which of the many videotape frames should be digitized and calculate a scaled optical fiber angle relative to the reference angle for each of the frames to be digitized. The program chooses which frames are to be digitized by providing approximately equal angular intervals between frames. This assures the chosen frames will represent the full range of fiber angles, and assures both high and low fiber angles will be represented with about the same number of frames. The scaled fiber angles are dimensionless quantities that are equal to actual angles (degrees) which have been divided by a scaling factor (degrees). This is done in order to make the scaled fiber angles small enough to avoid an overflow condition in the image processor when they are added together. "Frameangle" also prints out the actual fiber angles relative to the reference angle for some of the frames closest to the reference angle. These will be used later to develop an equation for the angle of the fiber as a function of the image processor row. The last value frameangle prints out is the camera angle. This is the same as the reference angle and is used in the program "calcontour" to adjust the view of the pool to overhead in preparation for plotting the weld pool topography.

There are 14 values to be input into program "frameangle" and each value is explained in the program. The number of runs is determined by viewing the videotape and choosing which runs are needed to map out the entire surface. The number of frames used per run is determined by dividing 60 to 100 by the number of runs used. The more frames entered, the more accurate the results would be expected to be. However, the total number of frames entered into the image processor has always been less than one hundred because the constant used to count frames is 0.01 and overflow occurs in the image processor if values get too close to one. The other parameters for frameangle which must be obtained from viewing the videotape are the beginning and ending frames for the weld pool reflections and the beginning and ending frames for the reflection on the polished surface. These are obtained by viewing each run that will be entered into the image processor and counting approximately how many frames before and after the reference frame have a reflection in them. These numbers of frames will serve as input for the program "frameangle" which will select the actual frames to be digitized. When counting approximately how many frames before and after the reference frame have a reflection in them, it is far better to overestimate than underestimate so frames with reflections in them at the extremes of the fiber angle range are not left out of the digitization process. It is almost necessary to use a video recorder with advanced features such as the Panasonic AG-6200 in order to keep track of the number of frames.

The arrangement of equipment used to digitize the images from videotape into the image processor is as follows. A Panasonic AG-6200 is used to display the frames on a Hitachi monitor. A Sony XC-57 CCD camera with a zoom lens is mounted on a tripod and views the Hitachi monitor from a position perpendicular to the face of the monitor. The Sony camera sends its signal to the Vicom image processor.

The first step in using the Vicom image processor is to initialize the drivers if they are not already started. This is done with the "autold" command. The command instruction mode is then entered by using the "cim" command. Image locations four and six must be zeroed to prepare for summing the images from videotape. The graphics planes are also enabled. The environment for the camera is set up by typing "call setup" and the camera input is activated by typing the "cam" command. While the frame to be entered into the image processor is displayed on the Hitachi monitor screen, the aperture of the zoom lens is adjusted so the image of the Vicom monitor is saturated (becomes black) at the location of the reflection but is not saturated for the rest of the image.

For each run, the frames to be entered into the image processor are indicated by the output from program "frameangle." Each frame is digitized, processed, and added to the previous frames by using a procedure file on the Vicom. The form of the command to enter each frame is "call d(angle" where angle is the scaled fiber angle (relative to the reference) associated with that particular frame as shown in the output of frameangle. After the frames have been entered for each run, it is useful to copy the images in locations 4 and 6 into higher memory locations such as 8 and 9 just in case a mistake is made during digitizing images of the next run.

After the images for all the runs of one surface contour measurement are entered into the image processor, image location number 4 will contain the composite scaled angle image and image location number 6 will contain the image showing how many angles are summed at each pixel. Since 0.01 is the multiple used to count the number of angles summed, the image in location number 6 will be called the 0.01 image.

After the images for all the runs of one surface contour measurement are entered into the image processor, an equation correlating the row on the Vicom screen and the fiber angle relative to the reference must be determined for the flat polished workpiece. This is done in order to take into account the effect described in FIG. 4. This could alternatively be done before entering the actual weld pool images. It is very important not to move the camera or Hitachi monitor during these processes. The Vicom row corresponding to the center of the reflection on the polished surface is determined for each frame of the "dry run." To determine the row number, the frame is digitized and then the interactive cursor command "#pcr" is used to get the row number of the center. Only frames where the reflection is not blocked by the reference rod are used. A table like the one shown in Table 1, for example, would be obtained.

TABLE 1

| Frame number | Row number from Vicom corresponding to center of reflection |
|---|---|
| 5 | 405 |
| 4 | 383 |
| 3 | 342 |
| −3 | 95 |
| −4 | 63 |
| −5 | 2 |

TABLE 2

| Frame number | Fiber angle relative to reference, degrees |
|---|---|
| 8 | 1.59301 |
| 7 | 1.40135 |
| 6 | 1.20761 |
| 5 | 1.01178 |
| 4 | 0.81381 |
| 3 | 0.61368 |
| 2 | 0.41135 |
| 1 | 0.20680 |
| 0 | 0.00000 |
| −1 | −0.20909 |
| −2 | −0.42049 |
| −3 | −0.63424 |
| −4 | −0.85038 |
| −5 | −1.06893 |
| −6 | −1.28992 |
| −7 | −1.51340 |
| −8 | −1.73939 |
| −9 | −1.96793 |
| −10 | −2.19905 |
| −11 | −2.43280 |
| −12 | −2.66919 |

The frame number is associated with the fiber angle relative to the reference by using the output from "frameangle" shown in Table 2.

Figure 7:
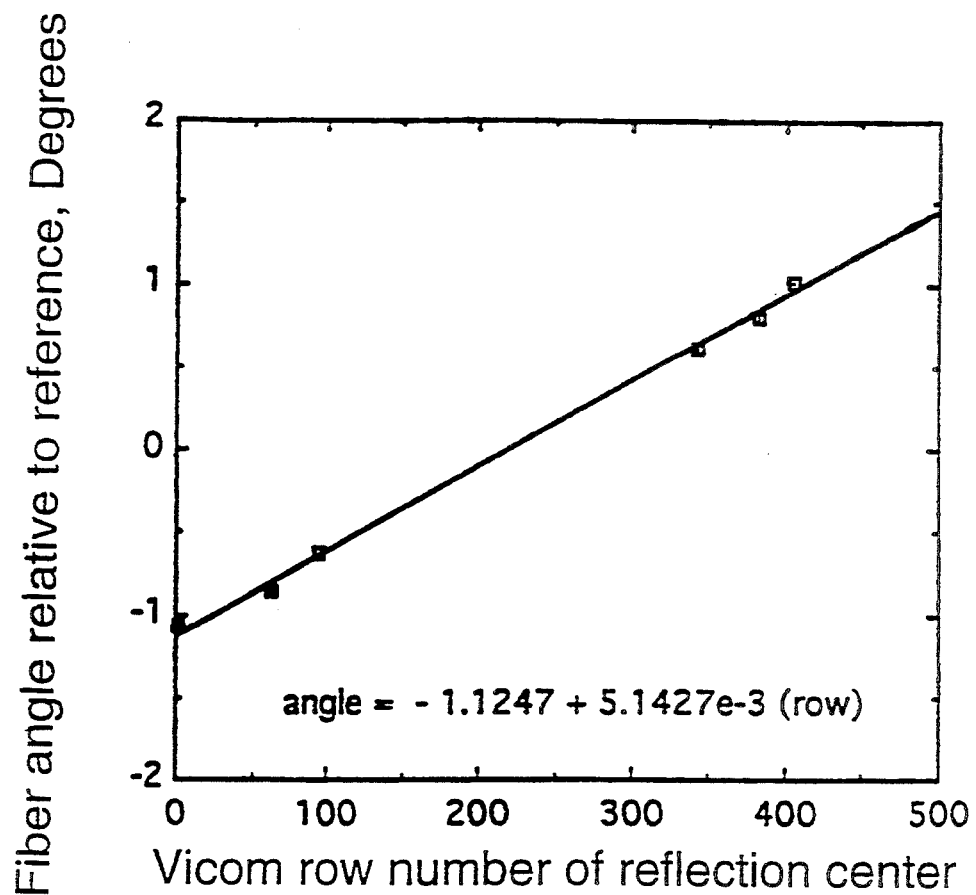
FIG. 7 is a graph obtained by calculations done in the program "frameangle."

The actual fiber angles from Table 2 would be plotted with the corresponding row numbers from Table 1 to obtain a graph such as the one shown as an example in FIG. 7. The curve fit for the data graphed in FIG. 7 is the equation needed. The application "Cricket Graph" on the Macintosh was used to obtain this equation relating the Vicom row with the fiber angle relative to the reference. This equation will be used later in a computer program called "calcontour." This procedure should be performed and a new equation generated for each surface contour measured if there is any change in the camera position, reference rod position, or any of the geometric parameters in "frameangle".

The composite scaled angle image in location number 4 of the Vicom and the 0.01 image in location number 6 must be processed before transferring them to the Sun workstation for more calculations. The reason for this processing is to define the boundary of the weld pool so the spurious reflections from the solid surface and chevrons surrounding the weld pool do not interfere with calculations of the weld pool surface contour. The steps for this image processing are as follows:

1. At the beginning of this procedure, there are two images; the composite scaled angle image and the composite 0.01 image. Make a copy of each one of these images for later use.
2. Use the composite image that includes the scaled angles of all the runs. Replace any graphics bits that may be ones with zeros in the composite image by using "zgr d." Add it onto itself until an image bright enough to be seen is obtained. It is not important if some overflow occurs because the actual values are not going to be used. It is only used to see the boundary of the pool. An example using actual image numbers is shown here:

```
cop 1>2
add 1,2>3(2
add 2,3>1(2
add 1,3>2(2
add 1,2>3(2
continue as needed
```

3. Make a copy of the image just in case a mistake is made while drawing the ellipse.
4. Use "#dra d" to make an ellipse around the weld pool. Use red, green, or blue but not yellow for the ellipse. Bit shifting and thresholding values used in later steps are chosen to be versatile enough for red, green, and blue but not for the single bit in the far right location associated with yellow. Save this image for later use.
5. Make a copy of the image created in step (4). Use "#dra d" to fill the ellipse in this copy with the same color as the ellipse outline.
6. Perform an exclusive or command on the images from step (4) and step (5). This command has the form "xor s1,s2>d." It will eliminate the angle values and only the part of the solid ellipse that is inside the outline of the ellipse will remain.
7. Shift the bits twelve to the left in order to bring the graphics bit to a location where the image can be threshholded. "lsh s>d(−12"
8. Threshold the interior of the ellipse to put ones in all the locations except bit location sixteen. "thr s>d(0.1"
9. Put a one in bit location sixteen and remove the ones from the graphics planes by shifting the bits one to the left and zeroing the graphics bits. "lsh s>d(−1" then "zgr d"
10. The resulting image is too dark to be seen but it is the interior of the ellipse with values of 1111 1111 1111 0000, and zeros all around it. This image should be "anded" with the actual composite scaled angle image from step (1) to clean away values from the solid area surrounding the weld pool. "and s1,s2>d"

11. "And" the interior of ellipse with the actual 0.01 image from step (1) to clean away values from the solid area surrounding the weld pool. "and s1,s2>d"

12. Perform the following bit shift on the image created and saved in step (4). Remove the scaled angles and make the value of the outline of the ellipse be 1000 0000 0000 0000 which equals −1 by shifting the bits to the left an amount determined by the color of the ellipse. If red was used for the ellipse, shift the bits −15. If green was used, shift −14. If blue was used, shift −13. "1sh s>d (bit shift"

13. Add this ellipse outline to the composite scaled angle image created in step (10) so that only two images have to be transferred to the Sun. "add s1,s2>s3(2"

These commands are performed in cim and follow the nomenclature defined in the Vicom Operator's Manual. When this processing is completed, the two images are transferred to the Sun workstation. The file on the Sun that contains the scaled angle image should be named "prerwangle" and the file that contains the 0.01 composite image should be named "prerwquant."

Since the program used to transfer the two images to the Sun was written in C, the values in the files "prerwangle" and "prerwquant" have to be rearranged for future calculations with a FORTRAN program. A program named "readwrite" does this by reading the file written by the C transfer program and writing a standard FORTRAN file. The open statements have to be changed to prerwquant and postrwquant for the 0.01 image.

Figure 8C:
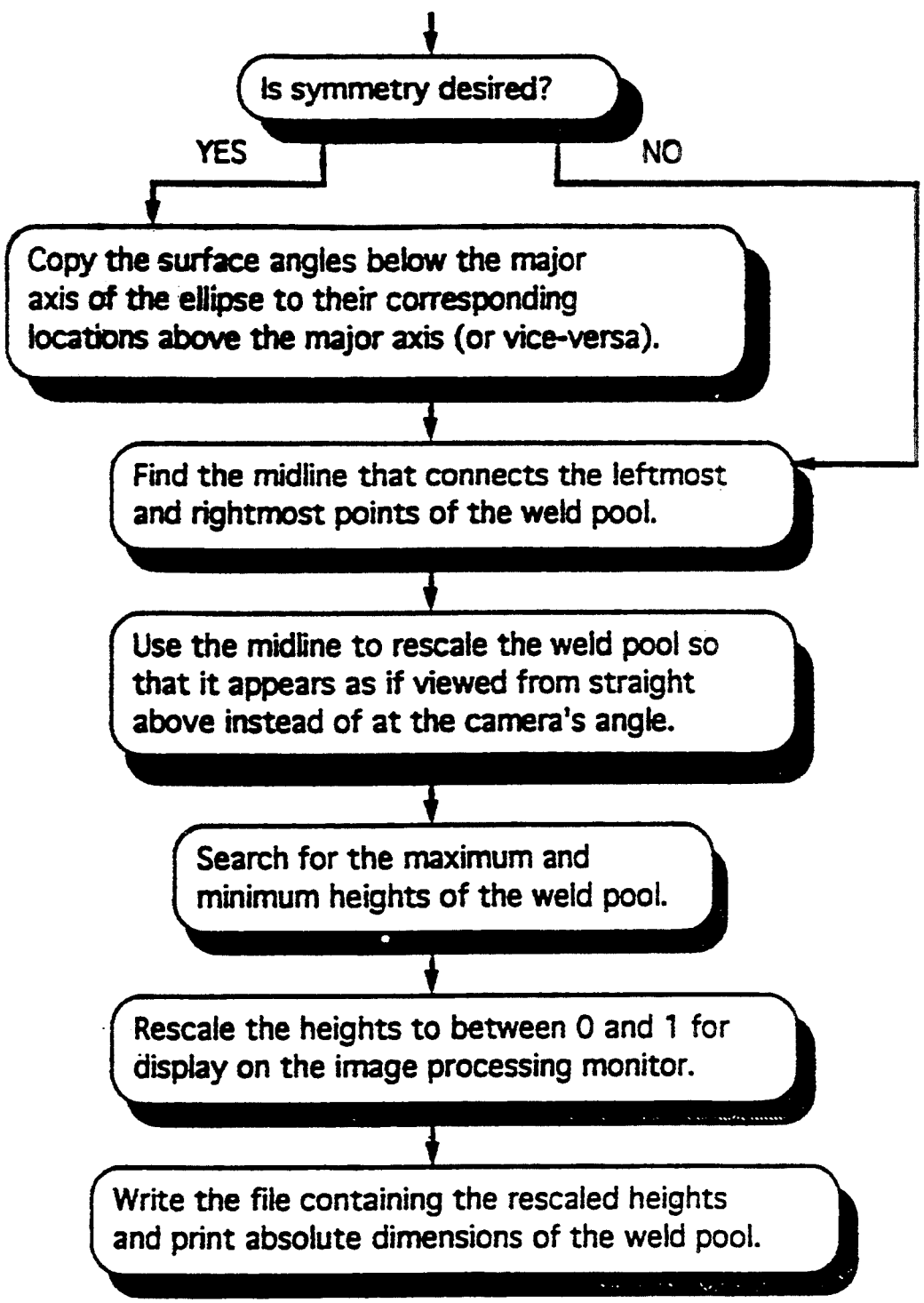

"Postrwangle" and "postrwquant" are input files for the next program involved in calculating the surface contour. This program is called "calcontour". A flow chart for calcontour is shown in FIGS. 8a through 8c. The input parameters of camera angle and angle scaling factor are taken from the output of program "frameangle." The pool width to be input is measured using a microscope. Symmetry has been used for all the weld pool results because it reduces the maximum errors at the bottom edge of the weld pool and results in a better looking surface surrounding the pool. Program "calcontour" prints out results such as the example shown below.

The width of the pool is 1.118 mm.
The length of the pool is 1.227 mm.
The maximum vertical width of the pool is 1.126 mm.
The maximum horizontal length of the pool is 1.336 mm.
The number of degrees the weld pool is rotated from major axis on horizontal is −1.19 (+indicates ccw rotation).
The deepest part of the pool surface is −0.32015E−01 mm below the level of the solid.
The highest part of the pool surface is 0.28232E−03 mm above the level of the solid.
The steepest angle of the melt pool surface is 6.065 degrees. (+means the pool surface is sloping down toward the camera.)

And it also creates a file called "scaledheight" which can be transferred back to the Vicom using the same transfer program used earlier. There are two parts in the program "calcontour" the user should be aware of because they often need to be changed. The first is the equation correlating the Vicom row of the center of the polished workpiece reflection with the fiber angle. This equation is the one found using the Macintosh. The second part is the scaling of the calculated heights. The heights need to be scaled to between 0 and 1 so they plot correctly on the image processor. The heights can be scaled between 0 and 1 for each surface by using the maximum height of each surface to do the scaling or the maximum of many different surfaces can be used to see the heights of the surfaces relative to each other.

The file named "scaledheight" that is created by the program "calcontour" must be transferred to the Vicom by using the transfer program. After it is stored in the Vicom, it must be transposed to orient it correctly. This is done with the "trp s>d" command. This image can then be plotted with a mesh-like plot to see the surface. This plot is done by using the command "psp s>d." Various parameters can be added to orient the plot as desired.

While the preferred embodiment has been described in great detail, it is to be understood that other models of recorders, cameras, monitors, computers, controllers, and lasers, could be employed without departing from the scope of the invention.

What is claimed is:

1. A noncontact measurement system for determining the contour of an object comprising:
   an object to be measured,
   a first light source focused close to the surface of said object,
   a flat metal strip,
   a wedged shaped platform on one end of said strip,
   optical fiber means with an input and an output the output of which is mounted on said wedged shaped platform for directing light at said object,
   a second light source for sending a beam to the input of said optical fiber means,
   a translation stage in physical contact with said metal strip and capable of moving said metal strip so as to change the angle of the output of said optical fiber means,
   a camera for receiving reflected light from said object,
   a narrow beam filter between said object and said camera,
   a recording means for recording light angle reflections given off by said object and received by said camera, and
   controller means connected to the translation stage for varying the position of said translation stage.

2. The system of claim 1 further including a first computer means to process the data recorded by said recording means and capable of calculating values needed for further analysis of the recorded data.

3. The system of claim 2 including a second computer means for integrating the data obtained by said first computer means.

4. A system in accordance with claim 3 in which said first and second light sources are lasers.

5. The system of claim 4 further including a reference rod between the object and the translation stage so that a shadow is cast on said object when the object, the rod, and the output of said fiber optic means are in line with each other.

6. A system in accordance with claim 5 in which said controller means operates so that the angle of incident light from said optical fiber means is varied to allow the reflected light received by the camera to travel over the entire surface of said object.

7. The system of claim 1 in which said object rests on a second translation stage.

8. The system of claim 7 in which said second translation stage moves horizontally.

9. An on-line, noncontact method of measuring the surface contour of an object comprising the steps of:

aligning a measuring system which comprises at least a laser, a camera, an optical fiber having an input for receiving light from said laser and having an output, a reference piece between said optical fiber output and said camera, and a flat polished workpiece disposed so that laser light is reflected from the workpiece to establish a surface reference angle which is in the camera's field of view and is recorded, measuring the geometry of said system, replacing said flat workpiece with the object whose contour is to be measured, moving said optical fiber so that multiple paths are traced over the object by the laser light, recording the angle of the laser reflected light at multiple locations of the object on videotape frames, calculating a scaled fiber angle relative to the flat surface reference angle for each frame of videotape, selecting and digitizing certain of the videotape frames so as to obtain two composite images at each of said selected multiple locations, and determining the elevation of the surface at each said location.

10. The method of claim 9 in which the optical fiber angle is varied by changing the angle of a hinged arm to which the optical fiber is attached.

11. The method of claim 10 in which said hinged arm is attached to a translator stage which is moved by a motion controller.

12. The method of claim 11 in which said calculating is done by means of a first computer program.

13. The method of claim 12 in which said determining is done by means of a second computer program.

* * * * *